United States Patent
Okamoto

(10) Patent No.: US 8,094,734 B2
(45) Date of Patent: Jan. 10, 2012

(54) WIRELESS COMMUNICATION APPARATUS AND WIRELESS COMMUNICATION METHOD

(75) Inventor: Naoki Okamoto, Chiba (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 1060 days.

(21) Appl. No.: 11/911,309

(22) PCT Filed: Feb. 27, 2006

(86) PCT No.: PCT/JP2006/303559
§ 371 (c)(1),
(2), (4) Date: Oct. 11, 2007

(87) PCT Pub. No.: WO2006/114932
PCT Pub. Date: Nov. 2, 2006

(65) Prior Publication Data
US 2009/0016412 A1  Jan. 15, 2009

(30) Foreign Application Priority Data
Apr. 18, 2005 (JP) .................. 2005-120427

(51) Int. Cl.
H04K 27/00 (2006.01)
H04L 27/28 (2006.01)

(52) U.S. Cl. ........ 375/260; 375/146; 375/147; 375/295; 375/316

(58) Field of Classification Search .................. 375/260, 375/145, 146, 295, 316
See application file for complete search history.

(56) References Cited

U.S. PATENT DOCUMENTS

| 6,870,826 B1 | 3/2005 | Ishizu et al. | |
|---|---|---|---|
| 7,200,177 B2* | 4/2007 | Miyoshi | 375/260 |
| 2002/0159425 A1 | 10/2002 | Uesugi et al. | |
| 2003/0185179 A1 | 10/2003 | Inogai et al. | |
| 2003/0214927 A1 | 11/2003 | Atarashi et al. | |
| 2004/0042386 A1 | 3/2004 | Uesugi et al. | |
| 2004/0071078 A1 | 4/2004 | Sudo | |
| 2004/0071105 A1 | 4/2004 | Maeda et al. | |
| 2004/0086027 A1* | 5/2004 | Shattil | 375/146 |

(Continued)

FOREIGN PATENT DOCUMENTS

JP  2000-332724 A  11/2000

(Continued)

OTHER PUBLICATIONS

Atarashi et al., "Variable Spreading Factor-Orthogonal Frequency and Code Division Multiplexing (VSF-OFCDM) for Broadband Packet Wireless Access," IEICE Trans. Commun., vol. E86-B, No. 1, 2003, pp. 291-299.

(Continued)

Primary Examiner — Ted Wang
(74) Attorney, Agent, or Firm — Birch, Stewart, Kolasch & Birch, LLP

(57) ABSTRACT

Interference of multiplexed signals is reduced in an MC-CDMA communication system.
A wireless communication apparatus performing a wireless communication by combining a multicarrier transmission system with a spread spectrum includes: a rearrangement control part that ranks each subcarrier in accordance with a magnitude of received power based on received power information indicating received power of each subcarrier received from a communicating apparatus and groups subcarriers in descending or ascending order of the rank in accordance with a spreading factor; and a rearrangement part that distributes a spread code to each of the groups.

4 Claims, 18 Drawing Sheets

U.S. PATENT DOCUMENTS

2004/0213187 A1* 10/2004 Fujil .................... 370/335
2005/0232135 A1* 10/2005 Mukai et al. ............ 370/208

FOREIGN PATENT DOCUMENTS

| | | |
|---|---|---|
| JP | 2002-190788 A | 7/2002 |
| JP | 2003-46474 A | 2/2003 |
| JP | 2003-46481 A | 2/2003 |
| JP | 2003-169036 A | 6/2003 |
| JP | 2003-304220 A | 10/2003 |
| JP | 2004-40190 A | 2/2004 |
| JP | 2004-48716 A | 2/2004 |
| JP | 2004-134978 A | 4/2004 |
| JP | 2004-153431 A | 5/2004 |
| JP | 2005-318434 A | 11/2005 |

OTHER PUBLICATIONS

"Special Articles on 4th Generation Wireless Access Technology," NTT DoCoMo Technical Journal, vol. 5, No. 2, published Sep. 2003.
Atarashi et al., "Comparison of Broadband Packet Wireless Access," Technical Report of IEICE, RCS2000-136, pp. 59-66, published Oct. 6, 2000.

* cited by examiner

|   | MODULATION METHOD | CODING RATE | REQUIRED CNR |
|---|---|---|---|
| 1 | BPSK | 1/2 | 5dB |
| 2 | BPSK | 2/3 | 6dB |
| 3 | QPSK | 1/2 | 7dB |
| 4 | QPSK | 2/3 | 8dB |
| 5 | 16QAM | 1/2 | 10dB |
| 6 | 16QAM | 2/3 | 12dB |
| 7 | 64QAM | 1/2 | 14dB |
| 8 | 64QAM | 2/3 | 16dB |

FIG.4

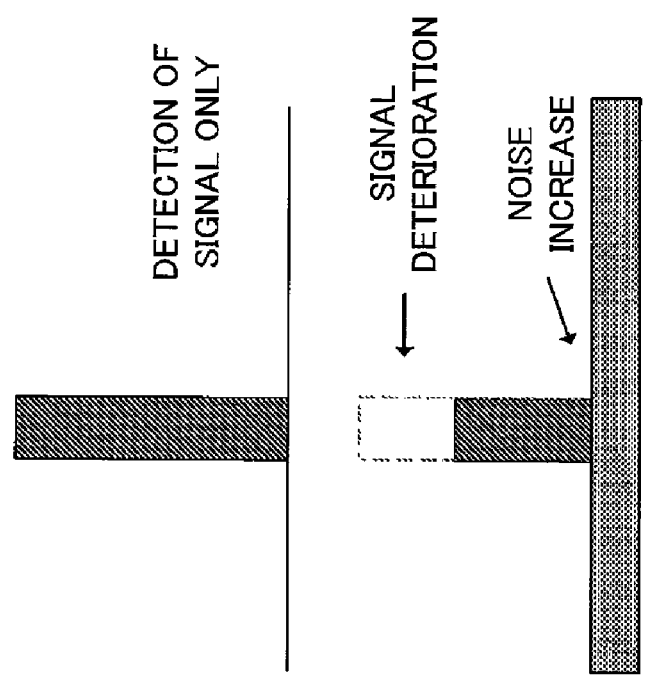
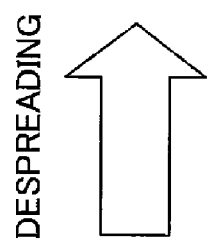
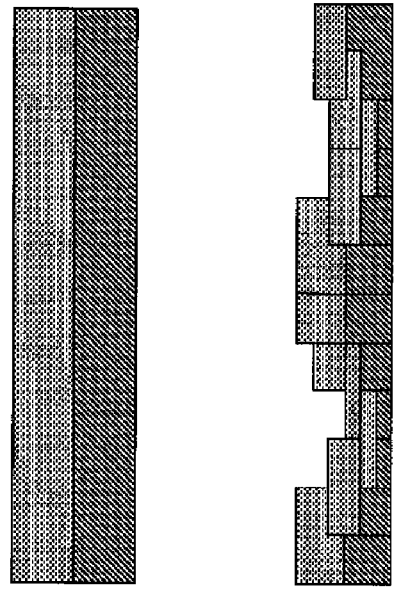
FIG.18

WIRELESS COMMUNICATION APPARATUS AND WIRELESS COMMUNICATION METHOD

TECHNICAL FIELD

The present invention relates to a wireless communication apparatus and a wireless communication method that perform a wireless communication by combining a multicarrier transmission system with a spread spectrum.

BACKGROUND ART

Multicarrier CDMA (hereinafter called "MC-CDMA") that combines a multicarrier transmission technology with a spread spectrum has conventionally gained attention as a major candidate for a next-generation mobile communication technology. In this MC-CDMA, spectrum spreading is performed on a data symbol and signals after spreading are allocated to subcarriers of OFDM. FIG. 15 is a block diagram showing an outline configuration of a transmitter that performs an MC-CDMA communication. In a transmitter 150, data to be transmitted is added with an error correcting code by a coding part 151 and modulated by a modulation part 152.

A multiplexing part (Mux part) 153 multiplexes the modulated data parallel-converted into as many portions as the number of subcarriers with a pilot signal used by a receiving side for estimating received SIR. Then, an S/P conversion part 154 converts the data into parallel signals. Further, each signal is copied by a copying part 155 to generate a plurality of signals. Here, the number of copied signals is equal to a spreading factor. That is, if the spreading factor is 16, for example, a signal is copied to generate 16 signals. Each copied signal is multiplied in order by a spread code generated by a spread code generation part 156 in a multiplier 157.

Thereafter, Fourier transform processing is performed by an IFFT part 158 and guard intervals are inserted by a guard interval insertion part 159 to generate an OFDM signal. Here, each subcarrier will be spread in order. That is, for SB1 (subcarrier 1) to SB16, the first data symbol is spread by spread codes 1 to 16, and for SB17 to SB32, the second data symbol is spread by the spread codes 1 to 16. Since original data symbols are converted into 16-fold spread symbols by spread processing, as described above, though the transmission rate drops to 1/16, multiplexing can be performed using different spread codes for a spread spectrum and therefore, the transmission rate can still be maintained.

FIG. 16 is a diagram showing an aspect of a spread symbol and a despread symbol. As shown in FIG. 16, each spread symbol is transmitted in a multiplexed form, but when despread, codes are orthogonal to one another and multiplexed signals do not interfere with one another and thus can completely be demultiplexed. That is, the following equation holds between spread codes a(t) and b(t):

$$\sum_{t=1}^{16} a(t) * b(t) \neq 0 \qquad [\text{Eq. 1}]$$

Since up to 16 signals that are completely orthogonal to one another can be taken for the spreading factor of 16, as shown above, the transmission rate when multiplexed 16-fold will be the same as when no spreading occurs, eliminating completely an influence of rate deterioration due to a spread spectrum.

As a modification of MC-CDMA, on the other hand, a method of spreading using two dimensions of the frequency and time axes has been proposed. In this two-dimensional spreading, one data modulated symbol is spread over $SF_{Time}$ continuous OFCDM (Orthogonal Frequency and Code Division Multiplexing) symbols and $SF_{Freq}$ continuous subcarriers, and the overall spreading factor can be represented by $SF=SF_{Time} \times SF_{Freq}$. Here, $SF_{Time}$ represents the spreading factor in a time dimension and $SF_{Freq}$ represents the spreading factor in a frequency dimension.

In the two-dimensional spreading, the overall spreading factor is controlled in accordance with a cell configuration. That is, a mobile station sets the spreading factor based on control information from a base station. Further, by adaptively controlling $SF_{Time}$ and $SF_{Freq}$ in accordance with propagation conditions, channel loads, radio parameters and the like, channel capacities are attempted to increase in both cellular systems and isolated cell environments.

[Non-Patent Document 1]: Shingaku Gihou RCS2000-136 "Study on Broadband Packet Wireless Access"

[Non-Patent Document 2]: NTT DoCoMo Technical Journal Vol. 5, No. 2 "Feature Story of 4$^{th}$ Generation Wireless Access Technology"

DISCLOSURE OF THE INVENTION

However, as shown in FIG. 17, a transmitted signal may be subjected to frequency selective fading due to multipath, depending on propagation path conditions. The left side of FIG. 17 shows a frequency spectrum on a transmitting side and the right side shows a frequency spectrum on a terminal side. As shown in FIG. 17, the frequency spectrum on the terminal side has a high level of reception at some places a low level of reception at others. As a result, as shown at an upper right corner in FIG. 17, the reception level of each subcarrier varies. If, in such a situation, a received signal is despread, orthogonality of multiplexed codes will be lost because amplitude levels of 16 subcarriers are different.

That is, if amplitude levels of 16 subcarriers are the same, as shown on an upper side of FIG. 18, detection of only a signal is possible. However, if amplitude levels of 16 subcarriers are different, as shown on a lower side of FIG. 18, multiplexed codes interfere with one another to significantly reduce reception sensitivity. This can be formulated as follows:

$$\sum_{t=1}^{16} a(t) * s(t) * b(t) \neq 0 \qquad [\text{Eq. 2}]$$

As solutions therefore, a processing method of making the amplitudes before despreading the same by multiplying the amplitude of each subcarrier by a calculated multiplying factor and a method of performing numerical calculations to make an interference component minimum have been adopted.

However, the above methods have been reported that they cannot eliminate interference components to leave reduced performance unchanged.

The present invention has been developed in view of the above situation and an object thereof is to provide a wireless communication apparatus and a wireless communication method that can reduce interference of multiplexed signals.

(1) To achieve the above object, the present invention has taken steps shown below. That is, a wireless communication apparatus according to the present invention is a wireless communication apparatus performing a wireless communication by combining a multicarrier transmission system with a spread spectrum, and comprises: a rearrangement control part that ranks each subcarrier in accordance with a magnitude of received power based on received power information indicating received power of each subcarrier received from a communicating apparatus and groups subcarriers in descending or ascending order of the rank in accordance with a spreading factor; and a rearrangement part that distributes a spread code to each of the groups.

Since subcarriers are grouped in accordance with the spreading factor in descending or ascending order of rank in accordance with a magnitude of received power of each subcarrier and a spread code is distributed to each group, as described above, spread signals will have almost identical levels of amplitude. Therefore, if despread on the receiving side, orthogonal relationships with multiplexed signals spread by other spread codes will almost be maintained. As a result, signals spread by other spread codes will not be interference components and thus, it becomes possible to prevent deterioration of signals and to realize high-quality communication.

(2) A wireless communication apparatus according to the present invention is also a wireless communication apparatus performing a wireless communication by combining a multicarrier transmission system with a spread spectrum after determining an adaptive modulation parameter for each subcarrier based on propagation path information received from a communicating apparatus, and comprises: an adaptive modulation control part that groups subcarriers having the identical determined adaptive modulation parameter in accordance with a spreading factor; and a rearrangement part that distributes a transmission signal to each of the groups and also distributes a spread code to each of the groups.

Since subcarriers having the same adaptive modulation parameter are grouped according to the spreading factor, a transmission signal is distributed to each group and also a spread code is distributed to each group, as described above, spread signals will have almost identical levels of amplitude. That is, in an adaptive modulation system, subcarriers having different received power levels are divided to some degree in equal intervals and thus, subcarriers having the same degree of modulation or the same rate of coding will have the same received power on the receiving side. Therefore, if despread on the receiving side, orthogonal relationships with multiplexed signals spread by other spread codes will almost be maintained. As a result, signals spread by other spread codes will not be interference components and thus, it becomes possible to prevent deterioration of signals and to realize high-quality communication.

(3) A wireless communication apparatus according to the present invention is also a wireless communication apparatus performing a wireless communication by combining a multicarrier transmission system with a spread spectrum after determining adaptive modulation parameters for a plurality of subcarrier groups consisting of a plurality of subcarriers based on propagation path information received from a communicating apparatus, and comprises: a rearrangement part that allocates a transmission signal to each of the subcarrier groups and also distributes a spread code to each of the subcarrier groups.

Since subcarriers are grouped and spread as groups, as described above, processing can be made simpler than when a spread code is distributed to each subcarrier. Also, since transmission signals are distributed to each subcarrier group having the same adaptive modulation parameter and also spread codes are distributed to each subcarrier group, spread signals will have almost identical levels of amplitude. In an adaptive modulation system, a subcarrier group having the same degree of modulation or the same coding rate will have the same received power on the receiving side. Therefore, if despread on the receiving side, orthogonal relationships with multiplexed signals spread by other spread codes will almost be maintained. As a result, signals spread by other spread codes will not be interference components and thus, it becomes possible to prevent deterioration of signals and to realize high-quality communication.

(4) A wireless communication apparatus according to the present invention is also the wireless communication apparatus according to any of claims 1 to 3 performing a wireless communication by combining a multicarrier transmission system with a spread spectrum while spreading in both directions of a frequency axis and a time axis, and further comprises: a frequency spreading factor calculation part that calculates the number of subcarriers spreading in a frequency axis direction so that a product of a spreading factor in the frequency axis direction and that in a time axis direction be a constant value.

Since the number of subcarriers spreading in the frequency axis direction is calculated so that the product of the spreading factor in the frequency axis and that in the time axis be a constant value, as described above, the number of subcarriers to be adjusted to an almost identical level can be made smaller. As a result, variations in amplitude will be smaller among subcarriers and orthogonality will be lost more rarely, enabling prevention of an increase in interference.

(5) A wireless communication apparatus according to the present invention is also a wireless communication apparatus performing a wireless communication by allocating a communication slot identified by one or more time channels defined by a fixed time length and one or more frequency channels defined by a fixed frequency band to each terminal device to be controlled, and comprises: a rearrangement control part that allocates subcarriers to each of the terminal devices; and a rearrangement part that distributes spread codes to the subcarriers allocated to each of the terminal devices.

Since subcarriers are allocated to each terminal device and spread codes are distributed to the subcarriers allocated to each of the terminal devices, as described above, received power at each terminal device will be almost the same. That is, in a system that allocates the communication slot to each terminal device, variations of amplitude levels of subcarriers will be much smaller than when distributed randomly to subcarriers. Therefore, if despread on the receiving side, orthogonal relationships with multiplexed signals spread by other spread codes will almost be maintained. As a result, signals spread by other spread codes will not be interference components and thus, it becomes possible to prevent deterioration of signals and to realize high-quality communication.

(6) Also in the wireless communication apparatus according to the present invention, the rearrangement control part groups subcarriers having approximately identical received power according to the spreading factor based on received power information indicating received power of each subcarrier received from a communicating apparatus and allocates grouped subcarriers to each of the terminal devices.

Since subcarriers having approximately identical received power are grouped according to the spreading factor and grouped subcarriers are allocated to each terminal device, spread signals will have almost identical levels of amplitude. Therefore, if despread on the receiving side, orthogonal relationships with multiplexed signals spread by other spread codes will almost be maintained. As a result, signals spread by other spread codes will not be interference components and thus, it becomes possible to prevent deterioration of signals and to realize high-quality communication.

(7) A wireless communication method according to the present invention is also a wireless communication method performing a wireless communication by combining a multicarrier transmission system with a spread spectrum, and comprises at least the steps of: receiving received power information indicating received power of each subcarrier from a communicating apparatus; ranking each subcarrier in accordance with a magnitude of received power based on the received power information; grouping subcarriers in accordance with a spreading factor in descending or ascending order of the rank; and distributing a spread code to each of the groups.

Since subcarriers are grouped in accordance with the spreading factor in descending or ascending order of rank in accordance with a magnitude of received power of each subcarrier and a spread code is distributed to each group, as described above, spread signals will have almost identical levels of amplitude. Therefore, if despread on the receiving side, orthogonal relationships with multiplexed signals spread by other spread codes will almost be maintained. As a result, signals spread by other spread codes will not be interference components and thus, it becomes possible to prevent deterioration of signals and to realize high-quality communication.

According to the present invention, spread signals will have almost identical levels of amplitude and therefore, if despread on the receiving side, orthogonal relationships with multiplexed signals spread by other spread codes will almost be maintained. As a result, signals spread by other spread codes will not be interference components and thus, it becomes possible to prevent deterioration of signals and to realize high-quality communication.

BRIEF DESCRIPTION OF THE DRAWINGS

FIG. 4 is a diagram showing relationships among modulation methods, coding rates, and required CNRs.

FIG. 18 is a diagram showing how a signal deteriorates and noise increases depending on propagation path conditions.

BEST MODES FOR CARRYING OUT THE INVENTION

Next, embodiments of the present invention will be described with reference to drawings.

First Embodiment

Figure 1:
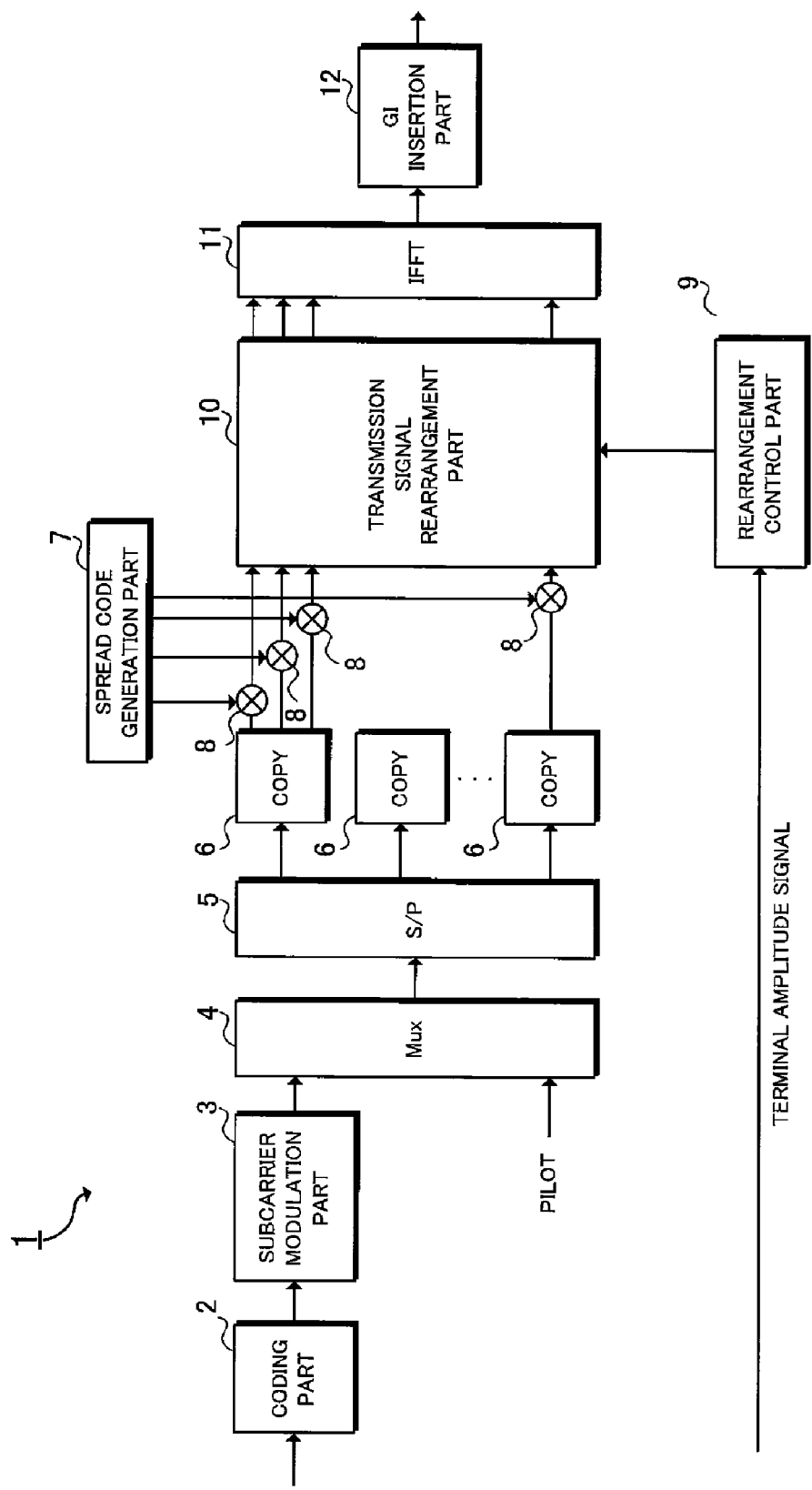
FIG. 1 is a block diagram showing an outline configuration of a transmitter according to a first embodiment.

FIG. 1 is a block diagram showing an outline configuration of a transmitter according to a first embodiment. In a transmitter 1, data to be transmitted is added with an error correcting code by a coding part 2 and modulated by a modulation part 3. A multiplexing part (Mux part) 4 multiplexes the modulated data parallel-converted into as many portions as the number of subcarriers with a pilot signal used by the receiving side for estimating received SIR. Then, an S/P conversion part 5 converts the data into parallel signals. Further, each signal is copied by a copying part 6 to generate a plurality of signals. Here, the number of copied signals is equal to a spreading factor. That is, if the spreading factor is 16, for example, a signal is copied to generate 16 signals. Each copied signal is multiplied in order by a spread code generated by a spread code generation part 7 in a multiplier 8.

A rearrangement control part 9 controls each of signals spread after being grouped together with approximately identical levels of received power on a receiver side so that there is no great difference of reception levels on the receiver side. A transmission signal rearrangement part 10 rearranges a sequence of signals multiplied by spread codes. Then, Fourier transform processing is performed by an IFFT part 11 and guard intervals are inserted by a guard interval insertion part 12 to generate an OFDM signal.

Here, each subcarrier will be spread in order. That is, for SB1 (subcarrier 1) to SB16, the first data symbol is spread by spread codes 1 to 16, and for SB17 to SB32 the second data symbol is spread by the spread codes 1 to 16. Since an original data symbol is converted into 16-fold spread symbols by spread processing, as described above, though the transmission rate drops to $1/16$, multiplexing can be performed using different spread codes for a spread spectrum and therefore, the transmission rate can still be maintained.

Figure 2:
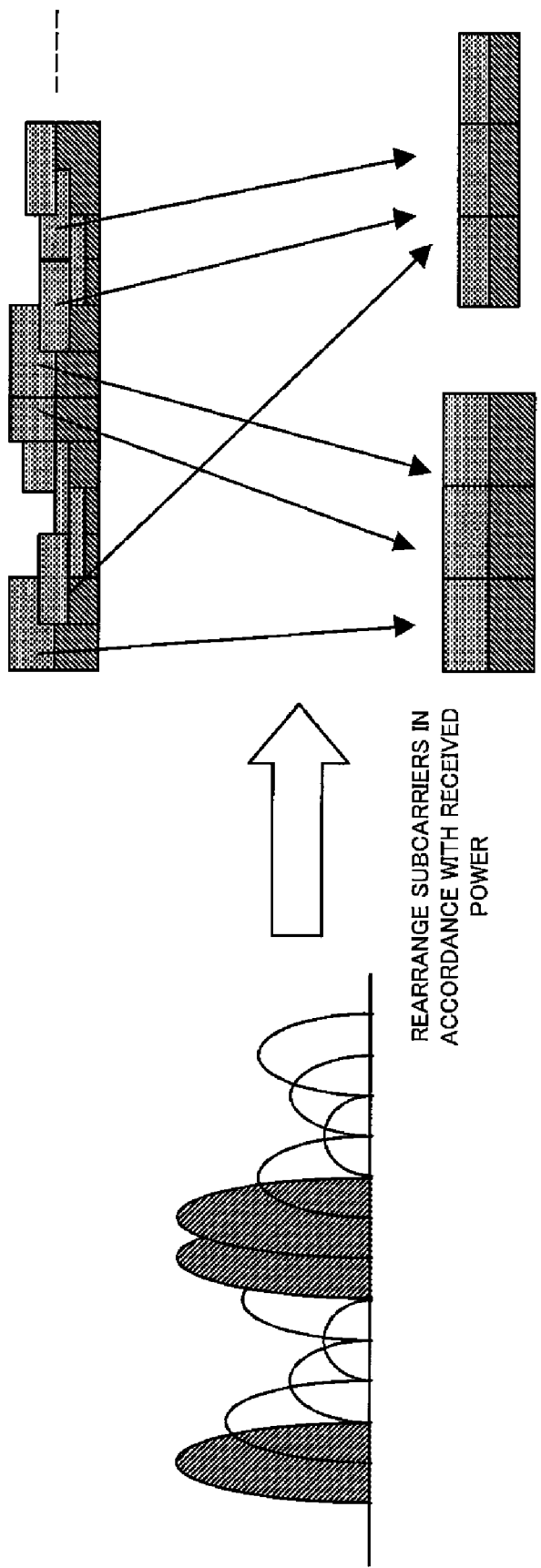
FIG. 2 is a schematic diagram showing how subcarriers are rearranged in accordance with received power of the subcarriers.

FIG. 2 is a schematic diagram showing how subcarriers are rearranged in accordance with received power of the subcarriers. FIG. 2 is a schematic diagram and the total number of subcarriers is eleven and the number of subcarriers having approximately identical levels is three, but in an actual system, the total number of subcarriers is several hundreds and several dozens of subcarriers having approximately identical levels exist. In that case, spread codes can be distributed to subcarriers having approximately identical levels.

Figure 3:
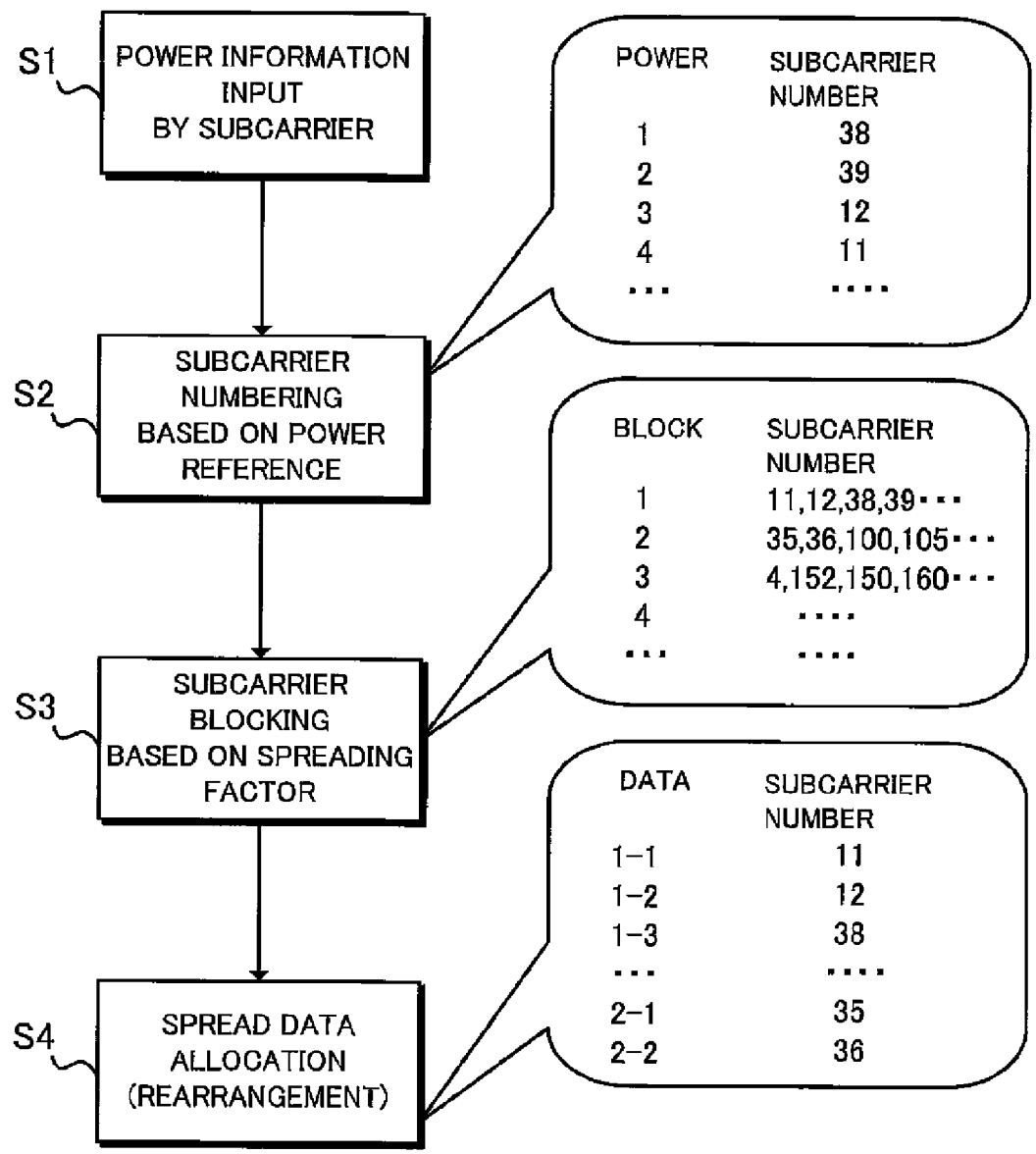
FIG. 3 is a flow chart showing a rearrangement operation.

FIG. 3 is a flow chart showing a rearrangement operation. First, power information by subcarrier is input based on received power information on the receiving side (step S1).

Next, subcarriers are numbered with reference to power (step S2). Here, subcarriers are numbered in descending order of received power. In an example shown in FIG. 3, for example, the subcarrier of the subcarrier No. 38 has the highest received power and the subcarrier of the subcarrier No. 12 has the third highest received power. Next, subcarriers are blocked (grouped) based on the spreading factor (step S3). The first block consists of subcarriers having received power higher than the highest reference value and is made up of subcarriers having the first to sixteenth highest received power. As shown in FIG. 3, for example, subcarriers of the subcarrier Nos. 11, 12, 38, 39 and so on belong to this block. The second block consists of subcarriers having received power higher than the second highest reference value and is made up of subcarriers having the seventeenth to thirty-second highest received power. As shown in FIG. 3, for example, subcarriers of the subcarrier Nos. 35, 36, 100, 105 and so on belong to this block.

Subsequently, one spread data symbol will be spread over to 16 subcarriers of each block (step S4) before being transmitted.

By rearranging subcarriers as described above, spread signals will have approximately identical amplitude levels and therefore, if despread on the receiving side, orthogonal relationships with multiplexed signals spread by other spread codes will almost be maintained. As a result, signals spread by other spread codes will not be interference components and thus, deterioration of signals can be prevented.

Though, in this case, the transmitter side must be informed of the reception level of each subcarrier on the receiver side to rearrange amplitude levels, various methods have been proposed for an adaptive modulation system and thus, the level on the receiving side can be known from the transmitter side by performing similar processing.

When grouping subcarriers in the present invention, the number of subcarriers in a group must be equal to the spreading factor or its integral multiple and therefore, though subcarriers are said to have approximately identical received power, a small amplitude difference may arise. In that case, it is also effective to match reception levels by making transmission output adjustments for each subcarrier through minor adjustments of power of transmitting subcarriers.

Second Embodiment

In OFDM modulation, an adaptive modulation/demodulation method in which the degree of modulation is changed depending on the reception level on the receiver side is known. The adaptive modulation/demodulation method is a system in which a plurality of degrees of modulation and coding rates is provided and adjusted to required CNRs (Carrier to noise ratio) needed by each for transmission.

FIG. 4 is a diagram showing relationships among modulation methods, coding rates, and required CNRs. FIG. 4 shows eight combinations of the coding/modulation method. An adaptive modulation system provides a plurality of methods in which the required CNR is different from each other, as shown above, and an optimal modulation method is selected from the plurality of methods depending on reception conditions of each subcarrier.

The above example is only an example and actually still more coding rates may be selected. The required CNR described above changes depending on an overall system and error correcting method and, though the example shown in FIG. 4 is only an example, each method is provided in such away that the required CNRs are set at somewhat regular intervals.

Figure 5:
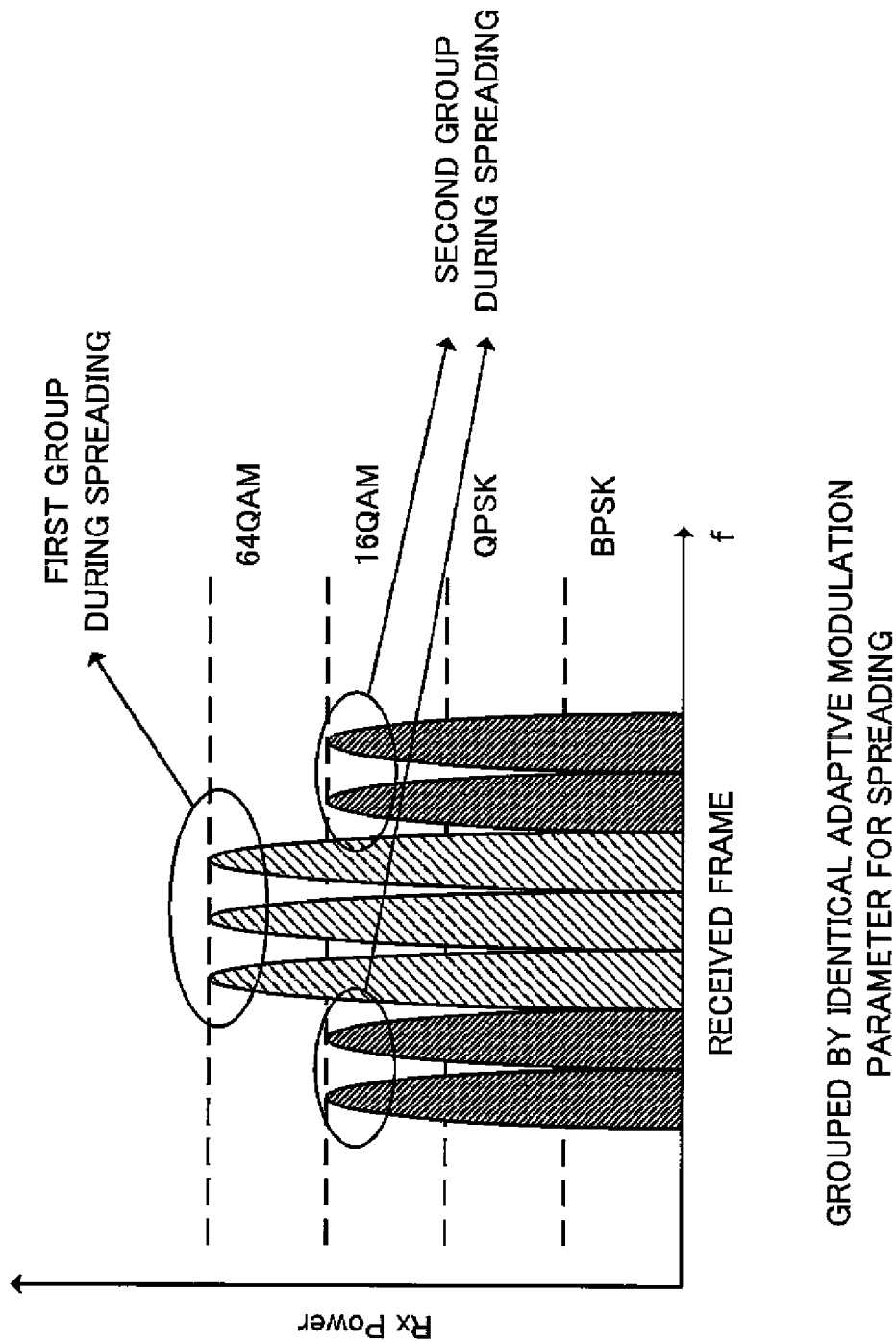
FIG. 5 is a diagram showing an example in which subcarriers are grouped based on the modulation method or coding rate.

In a second embodiment, the present invention is applied to an adaptive modulation system. FIG. 5 is a diagram showing an example in which subcarriers are grouped based on the modulation method or coding rate. That is, in the second embodiment, as shown in FIG. 5, a group of the same modulation and coding methods will be a spread unit.

Figure 6:
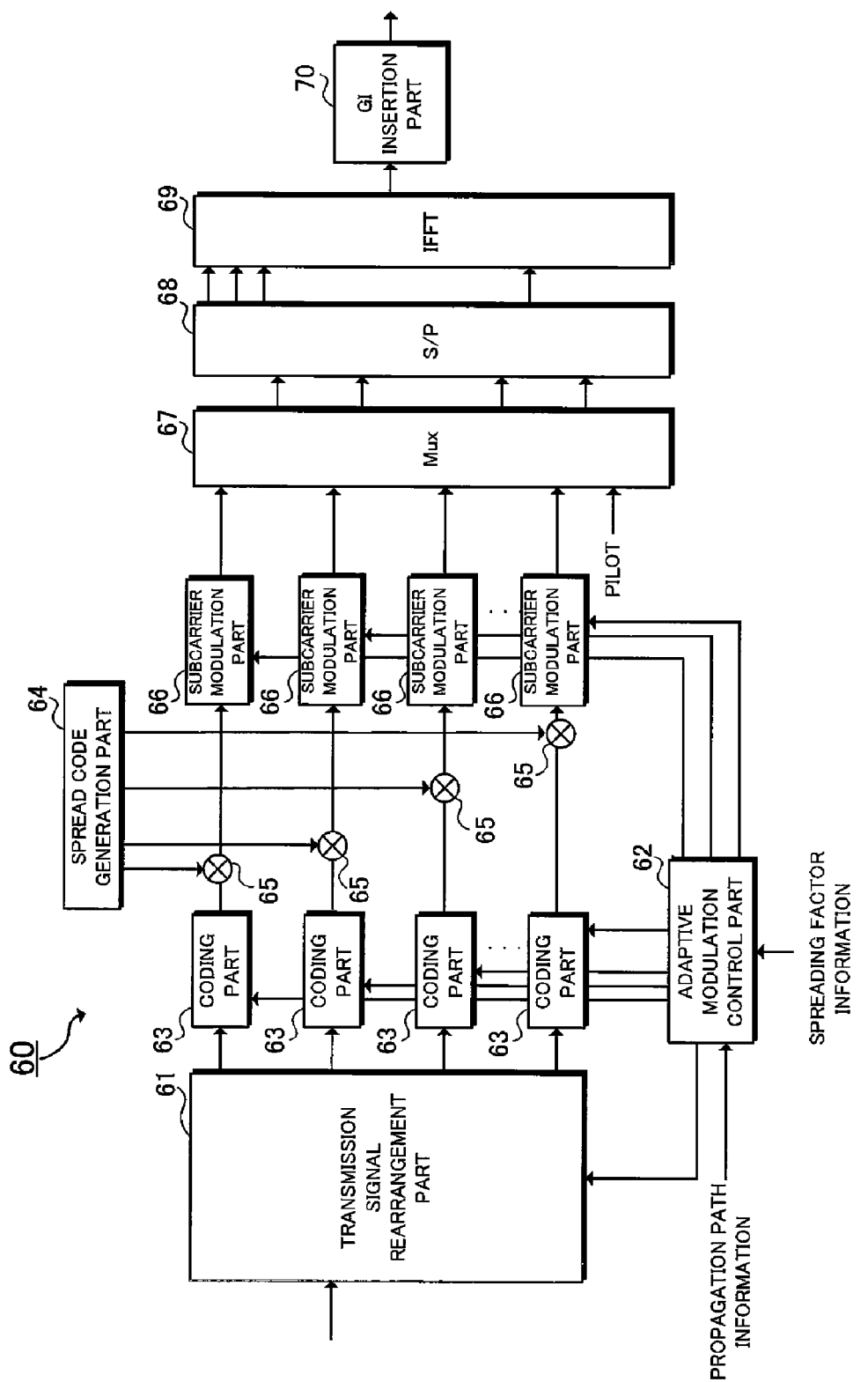
FIG. 6 is a block diagram showing the outline configuration of a transmitter according to a second embodiment.

FIG. 6 is a block diagram showing the outline configuration of a transmitter according to the second embodiment. A transmission signal rearrangement part 61 distributes signals corresponding to each modulation method and coding method depending on a signal input from an adaptive modulation control part 62. In the example shown in FIG. 4, signals are distributed among eight kinds. Each distributed signal obtains the same coding in each distributed group by each coding part 63. Then, each signal is multiplied by a spread code generated by a spread code generation part 64 in a multiplier 65 before being modulated by a subcarrier modulation part 66.

Subsequently, a pilot signal is added/multiplexed by a multiplexing part (Mux part) 67 and parallel/serial conversion is performed by an S/P conversion part 68 before each signal is allocated to each subcarrier. Then, Fourier transform processing is performed by an IFFT part 69 and guard intervals are inserted by a guard interval insertion part 70 to generate an OFDM signal.

Though the coding part 63 and the subcarrier modulation part 66 are depicted separately here to make it easier to understand, circuits can be saved in an actual configuration by using the same circuit block for the same coding rate and the same modulation method.

In the second embodiment, in a system in which subcarriers are separated into groups having the same degree of modulation or the same coding rate controlled by the adaptive modulation control part 62, as described above, groups thereof are utilized and spread processing is performed therein. Since, in an adaptive modulation system, levels of different received power of subcarriers are divided somewhat equidistantly, subcarriers selected based on the same level of degree of modulation and coding rate must have approximately the same power on the receiver side. Actually, however, the degree of modulation and the coding rate can take several values, as described above, and thus required power varies about between 1 and 2 dB, but grouping based on received power on the terminal side required for the first embodiment can be made unnecessary.

Incidentally, in the second embodiment, modulated data will increase by the spreading factor. Thus, when distributing data using signals of the adaptive modulation control part, its number will decrease by a factor of the spreading factor. In a system whose spreading factor is 16, for example, if the number of subcarriers of a subcarrier group that can use the same coding rate and the same modulation method controlled by an adaptive modulation/demodulation system is N, the number of signal data symbols is given by N/16. If, for example, the number of subcarriers selected for the same class is 48, 48/16=3, and thus three data symbols will be transmittable.

However, control in an adaptive modulation/demodulation system is distinguished by the received CNR and the like and thus, if the groupings are unchanged, the number of subcarriers may not be a multiple of the spreading factor (16 in the previous example). Thus, in the second embodiment, it is necessary to cause the adaptive modulation/demodulation groupings and spread groups to match. Two methods shown below can be considered.

The first method is to rearrange a remainder after division to a group immediately below (a level with less required CNR). As a result, the number of carriers will be divisible by 16.

Figure 7:
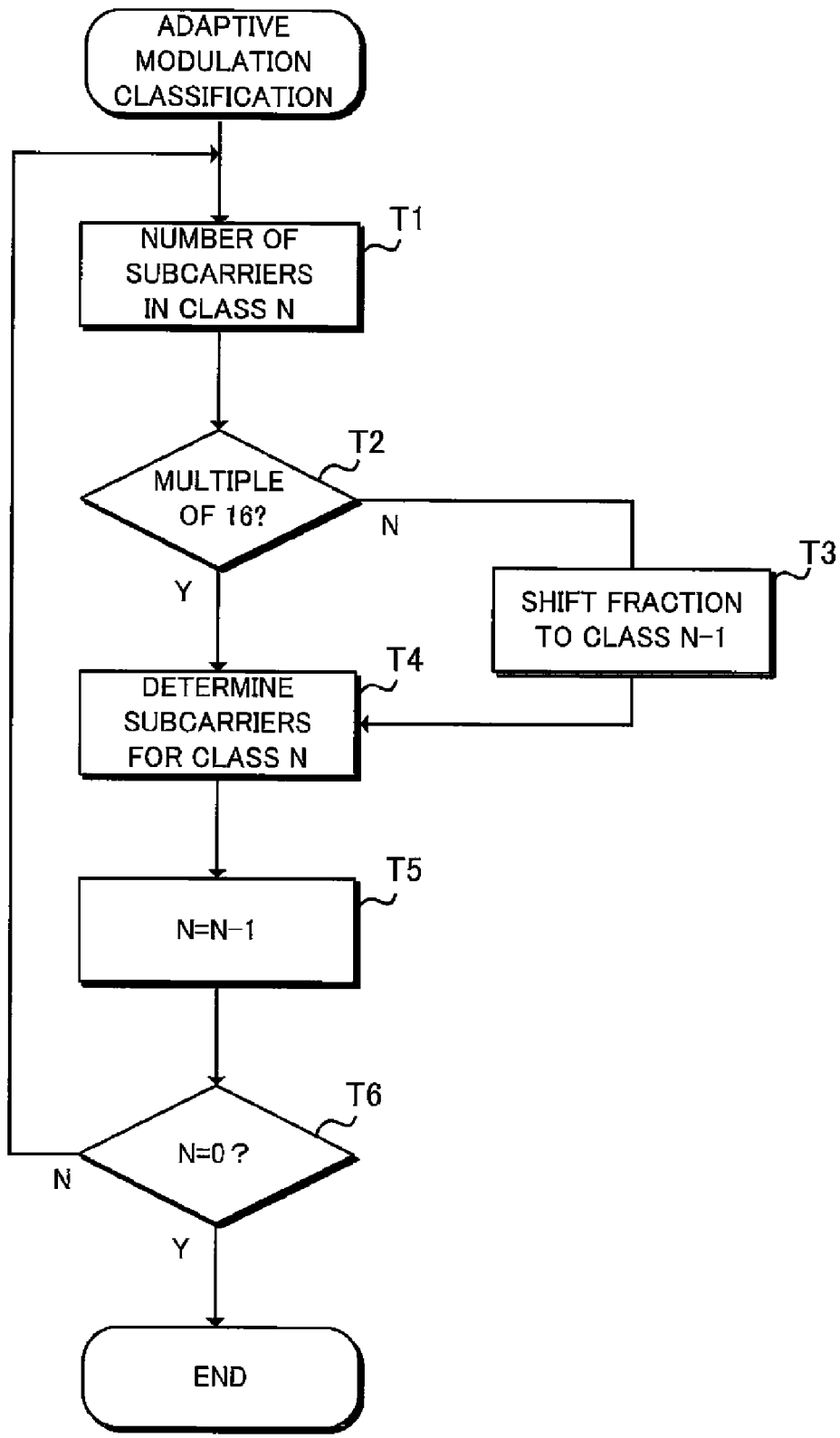
FIG. 7 is a flow chart showing an operation to cause the adaptive modulation/demodulation groupings and spread groups to match.

FIG. 7 is a flow chart showing an operation to cause the adaptive modulation/demodulation groupings and spread groups to match. First, determine the number of subcarriers in class N (step T1) and determine whether the number is a multiple of 16 (step T2). If the number is a multiple of 16, move to step T4 and, if not a multiple of 16, shift a fraction to class N−1 (step T3).

Next, determine subcarriers for class N (step T5) and set N=N−1 (step T5). Then, determine whether N is zero (step T6) and, if N is not zero, move to step T1. If, on the other hand, N is zero, terminate here. Moving down subcarriers belonging to a higher class (larger required CNR) to a lower class, as described above, will not cause any problem because there is as much receiving capacity as possible. Therefore, subcarriers are distributed from a higher class.

Figure 8:
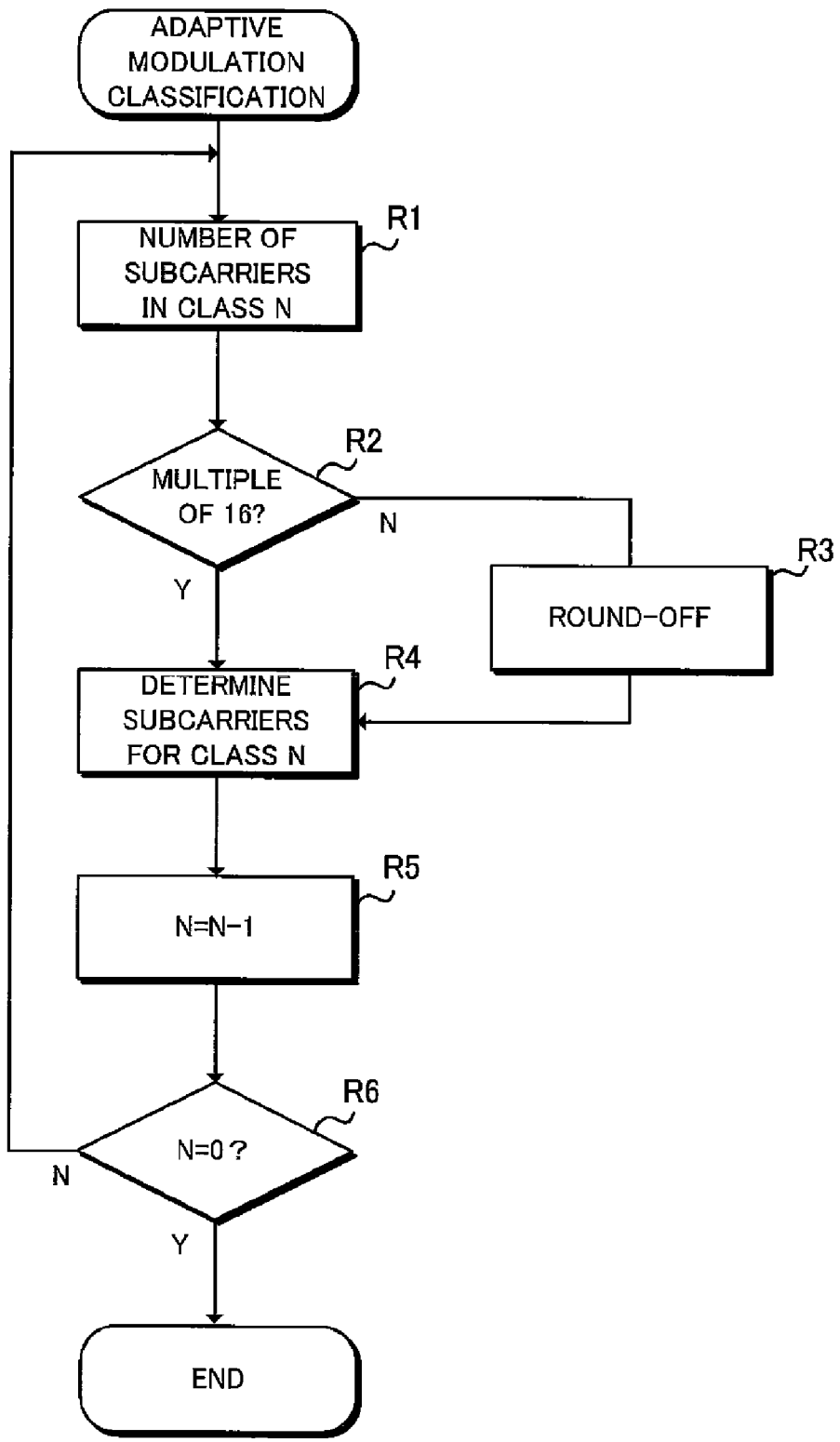
FIG. 8 is a flow chart showing an operation to cause the adaptive modulation/demodulation groupings and spread groups to match.

The second method is to round off to the nearest multiple of 16. This flow chart is shown in FIG. 8. First, determine the number of subcarriers in class N (step R1) and determine whether the number is a multiple of 16 (step R2). If the number is a multiple of 16, move to step R4 and, if not a multiple of 16, round off the number (step R3). By rounding off the number, the number of subcarriers in class N−1 may increase or decrease.

Next, determine subcarriers for class N (step R4) and set N=N−1 (step R5). Then, determine whether N is zero (step T6) and, if N is not zero, move to step T1. If, on the other hand, N is zero, terminate here. In this case, though making the number of subcarriers of the group a multiple of 16 may make it necessary to move up subcarriers of a lower reception level, a solution is found by adjusting output on the transmitting side for adaptive modulation because the level is low and matching the spreading factor to the adaptive modulation unit.

Third Embodiment

Figure 9:
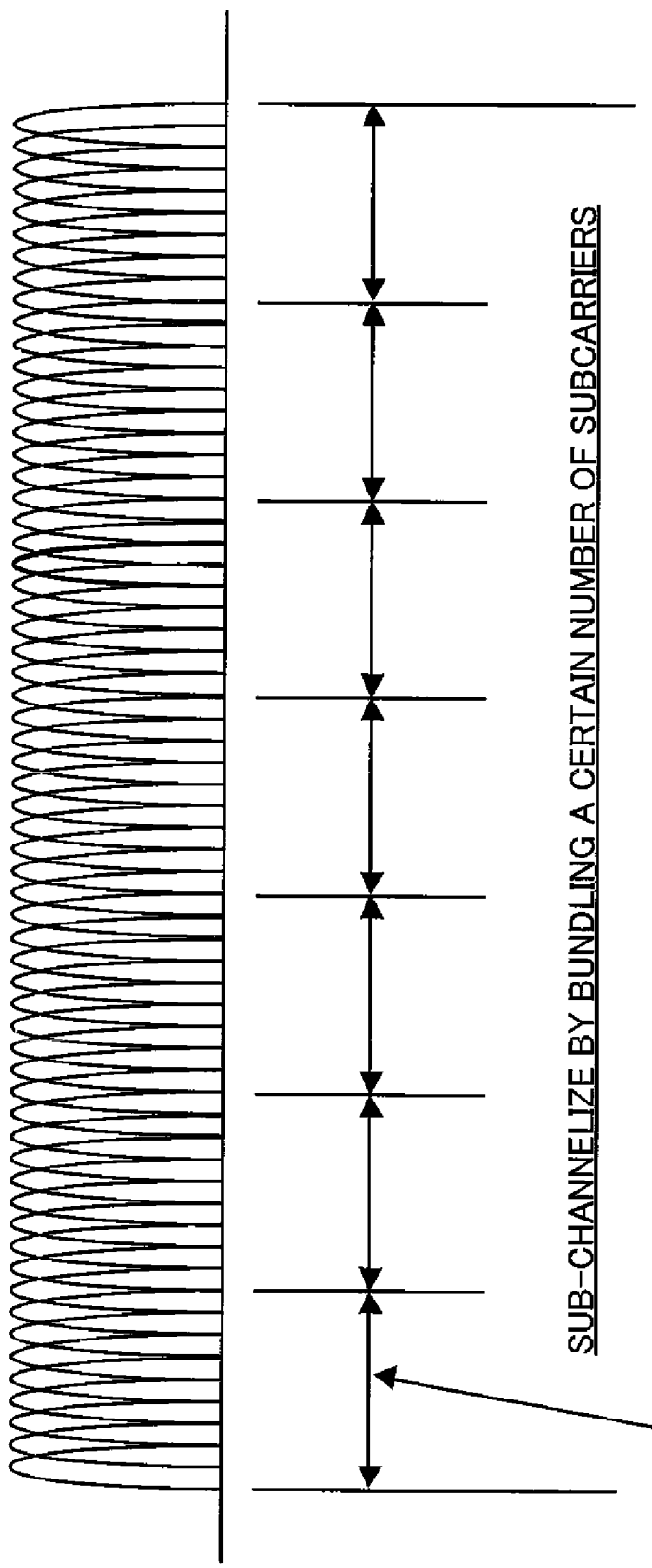
FIG. 9 is a diagram showing a concept of blocking of subcarriers in a third embodiment.

FIG. 9 is a diagram showing a concept of blocking of subcarriers in a third embodiment. In an adaptive modulation system, the most fundamental method optimizes the modulation method and coding method for each subcarrier, but in an actual system, subcarriers may be blocked to some degree for adaptation to avoid complicated processing. Such a situation is shown in FIG. 9. In such an adaptive modulation method, by selecting its unit as a reference for spreading, processing similar to that in each of the above embodiments can be performed. In this case, variations in amplitude within a subblock will be greater than in each of the above embodiments because no processing is performed in units of subcarrier, but by making the number of subcarriers in the subblock an integral multiple of the spreading factor, on the contrary, the above processing performed when the number of subcarriers cannot be divided by the spreading factor is made unnecessary.

Fourth Embodiment

As a modified method of MC-CDMA, a method in which two dimensions of the frequency and time axes are used for spreading has been proposed. If the present invention is applied to this method, it will become possible to increase flexibility of the above groupings. That is, the minimum unit is 16 when the spreading factor is 16 in the above example and thus, when subcarriers are made to have the same level of amplitude, many subcarriers may be dropped so that efficiency is degraded and, when adapted to the required CNR, substantial subcarrier power adjustments may be necessary, making realization in some cases impossible. Particularly when adaptive modulation/demodulation is used, it may in some cases be difficult to make the number of subcarriers in a group classified by the above adaptive modulation/demodulation an integral multiple of the spreading factor.

In such a case, it becomes effective to use time spreading to make the grouping unit smaller. Since it is sufficient for the spreading factor that (frequency×time) is constant, it is necessary to extend only the time axis without modifying groupings divided by the original adaptive modulation.

Figure 10:
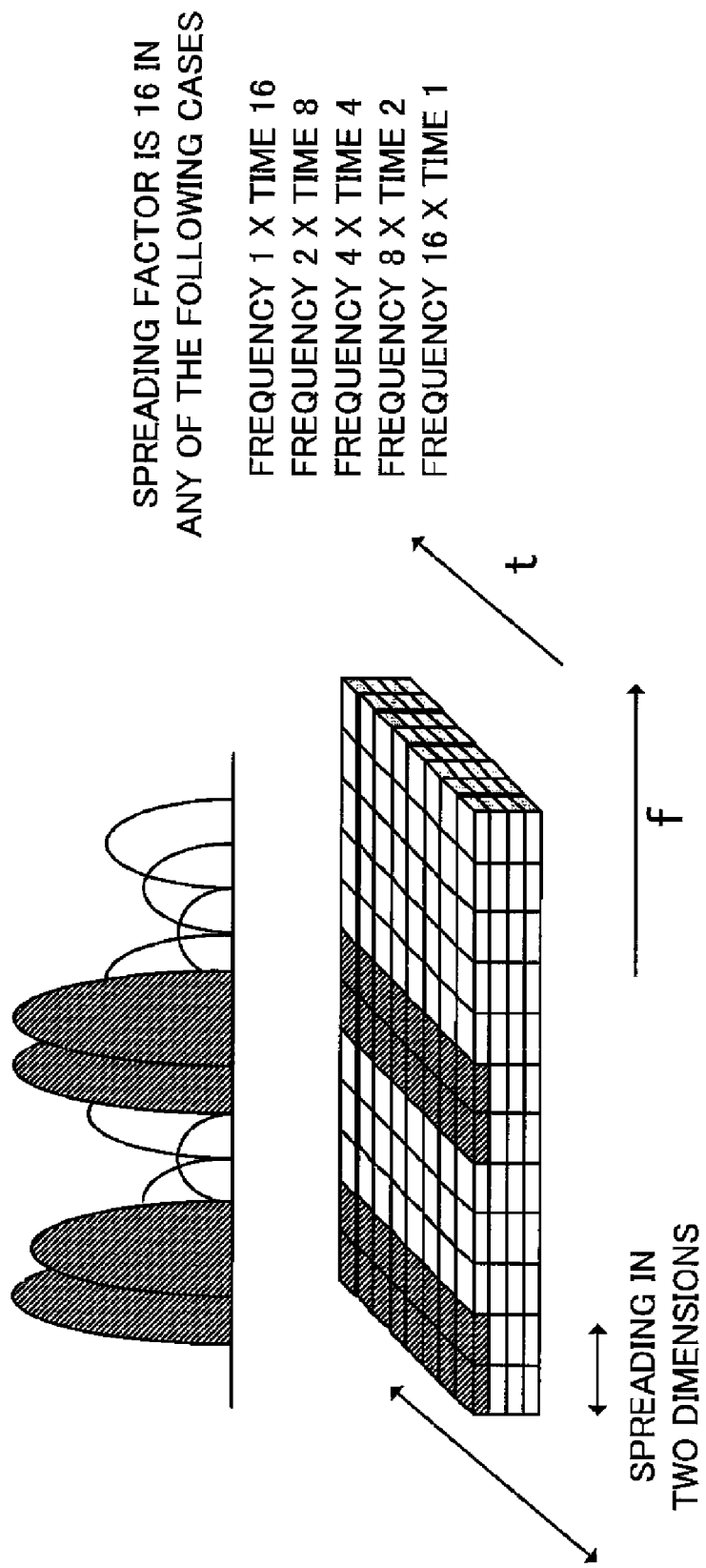
FIG. 10 is a diagram showing how spreading occurs in two dimensions.
Figure 11:
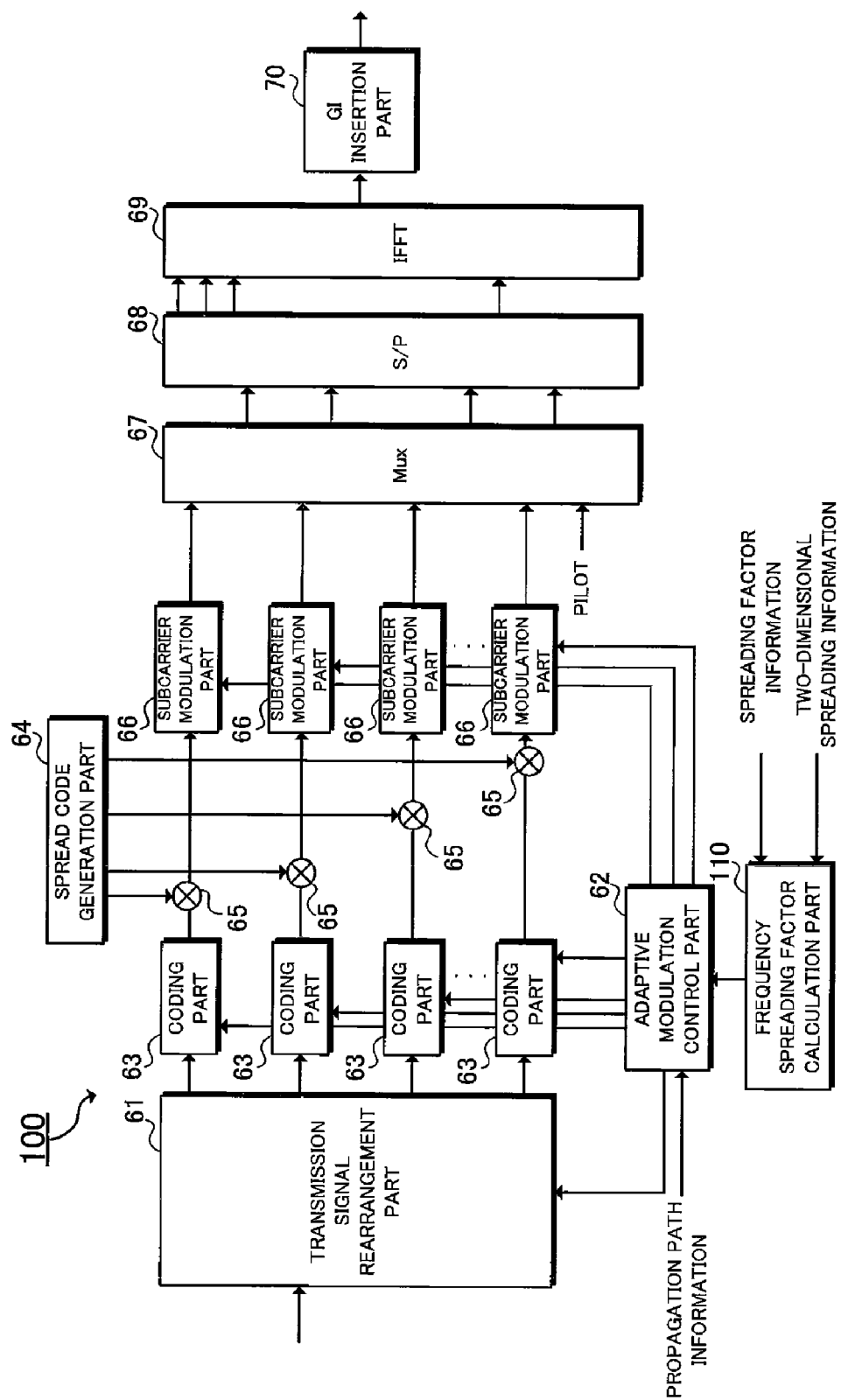
FIG. 11 is a block diagram showing the outline configuration of a transmitter that performs two-dimensional spreading.

FIG. 10 is a diagram how spreading occurs in two dimensions. FIG. 11 is a diagram showing the outline configuration of a transmitter that performs two-dimensional spreading. The basic method is the same as the adaptive modulation method shown in the second embodiment. However, in the second embodiment, the spreading factor is fixed to 16 (in a system of the spreading factor 16) and it is necessary to group subcarriers as a multiple of 16 on the frequency axis.

In the fourth embodiment, there is no need to stick to the multiple of 16 and it is sufficient to match subcarriers to multiples of 1, 2, 4, and 8 and therefore, the number of subcarriers to be matched to an approximately identical level will be smaller. As a result, subcarriers that vary only slightly in amplitude are grouped together, enabling prevention of orthogonality loss and an increase in interference. In a transmitter 100 shown in FIG. 11, as a concrete circuit, a frequency spreading factor calculation part 110 to calculate the number of subcarriers spread along the frequency axis is provided prior to an adaptive modulation control part 62. Other components are the same as those of the transmitter according to the second embodiment shown in FIG. 6. FIG. 11 shows an example in which two-dimensional spreading is applied to adaptive modulation, but modulation itself may not be adaptive modulation.

Fifth Embodiment

Figure 12:
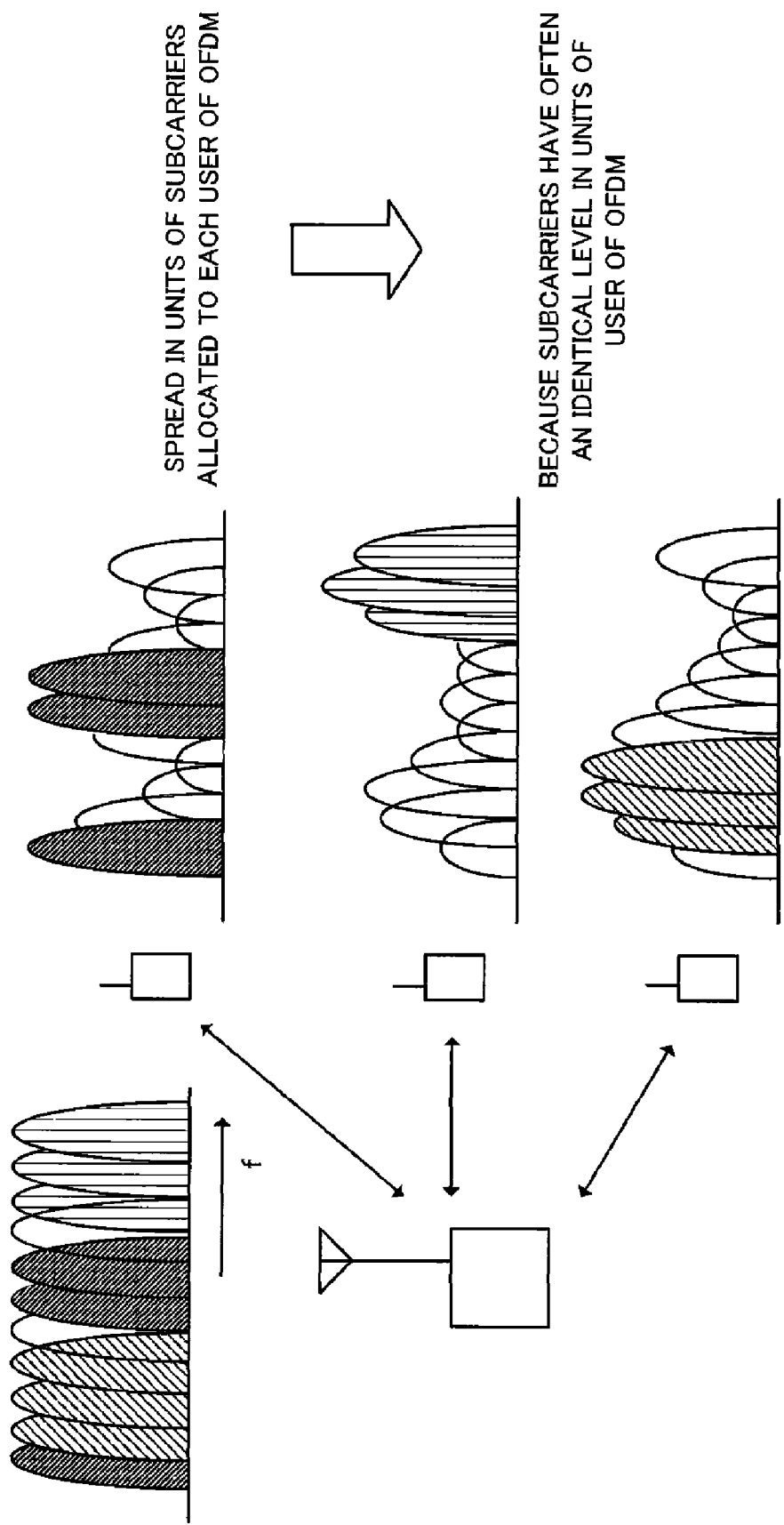
FIG. 12 is a diagram showing the concept of OFDMA.

Each of the above embodiments shows that communication is performed with one terminal using all subcarriers, but an OFDMA method in which subcarriers are divided and transmitted to a terminal is known. FIG. 12 is a diagram showing the concept of OFDMA. Propagation characteristics between a base station and each terminal is different from terminal to terminal and thus, even if transmitted with the same transmission power, received power received by each terminal is different from subcarrier to subcarrier and received power is diverse. Since a subcarrier received with strong power has a lower error rate, overall characteristics can be improved, compared with a method in which subcarriers are allocated in order to each terminal, by allocating subcarriers whose reception at a terminal is strong to such a terminal for transmission.

Thus, subcarriers distributed to each terminal according to OFDMA have constant received power at each terminal and therefore, allocation with only slight variations in amplitude is made possible by distributing subcarriers as a multiple of the spreading factor.

Figure 13:
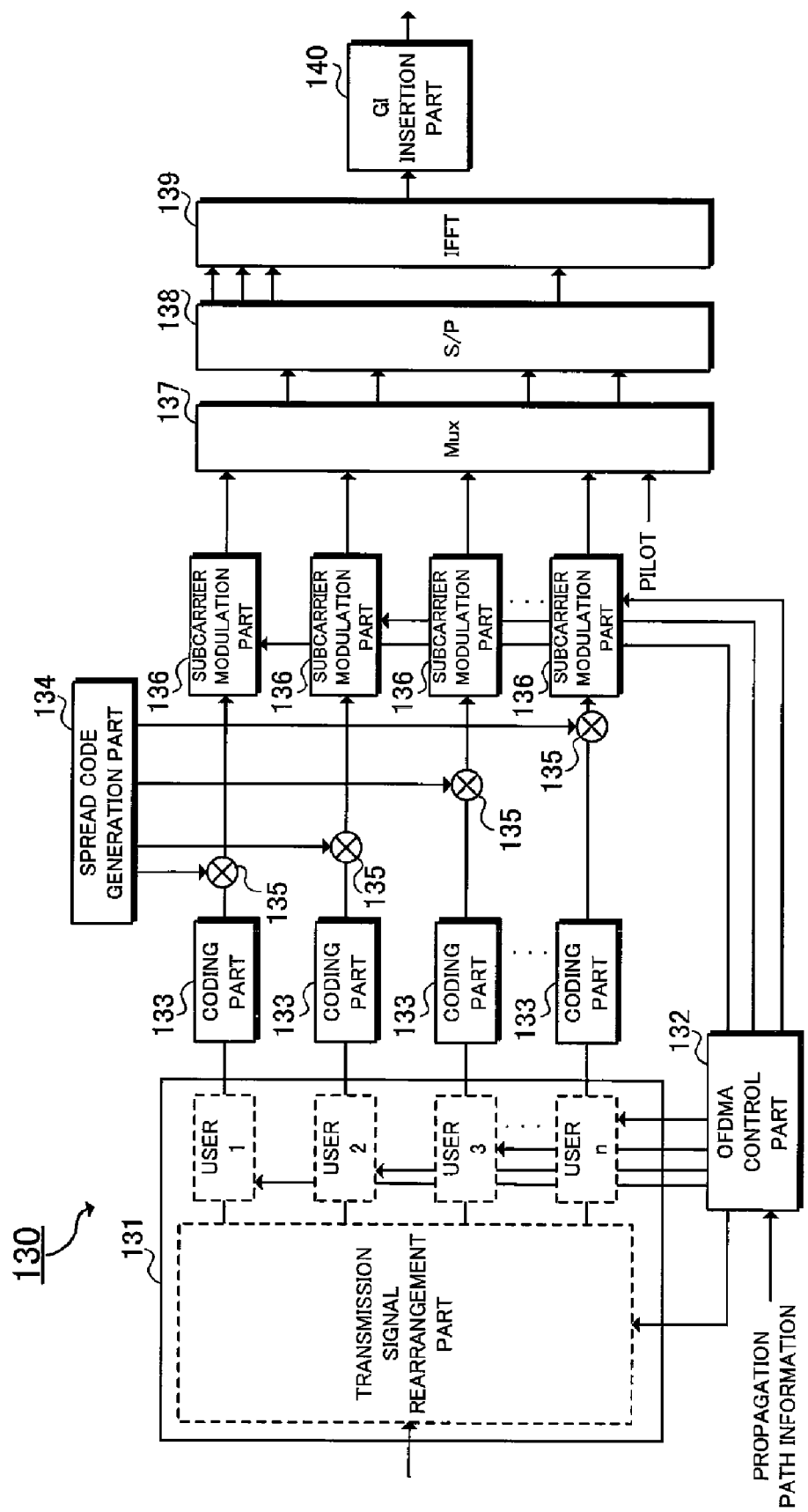
FIG. 13 is a block diagram showing the outline configuration of a transmitter of OFDMA.

FIG. 13 is a block diagram showing the outline configuration of a transmitter of OFDMA. In a transmitter 130, a transmission signal rearrangement part 131 distributes signals corresponding to each modulation method, coding method, and each user (terminal device) depending on a signal input from an OFDMA control part 132. Each distributed signal is coded in a coding part 133 for each distributed user.

Then, each signal is multiplied by a spread code generated by a spread code generation part 134 in a multiplier 135 and spread before being modulated by a subcarrier modulation part 136.

Subsequently, a pilot signal is added/multiplexed by a multiplexing part (Mux part) 137 and parallel/serial conversion is performed by an S/P conversion part 138 before each signal is allocated to each subcarrier. Then, Fourier transform processing is performed by an IFFT part 139 and guard intervals are inserted by a guard interval insertion part 140 to generate an OFDM signal.

In OFDMA, the OFDMA control part 132 determines which subcarrier to allocate to each user. Distributed subcarriers whose amplitude level is better are aligned in a receiver of each user than when distributed randomly. In the fifth embodiment, spreading occurs in units of distributed users. As a result, spreading can occur within subcarriers without a difference of significant amplitude levels.

Sixth Embodiment

Various distribution rules can be considered for each terminal in the OFDMA method and when being allocated to three terminals, for example, a method of dividing among three terminals from the best subcarriers can be considered as an orthodox method. In that case, however, each terminal gets subcarriers allocated in descending order of received power and all terminals get subcarriers with weak power and thus, it is never certain that subcarriers allocated to one reception terminal will have the same reception level. Therefore, compared with the method of distributing in order, subcarriers having more aligned amplitudes can be put together by distributing in units of spread subcarriers (for example, 16) that will have an identical level at each terminal. Interference can thereby be reduced.

Figure 14:
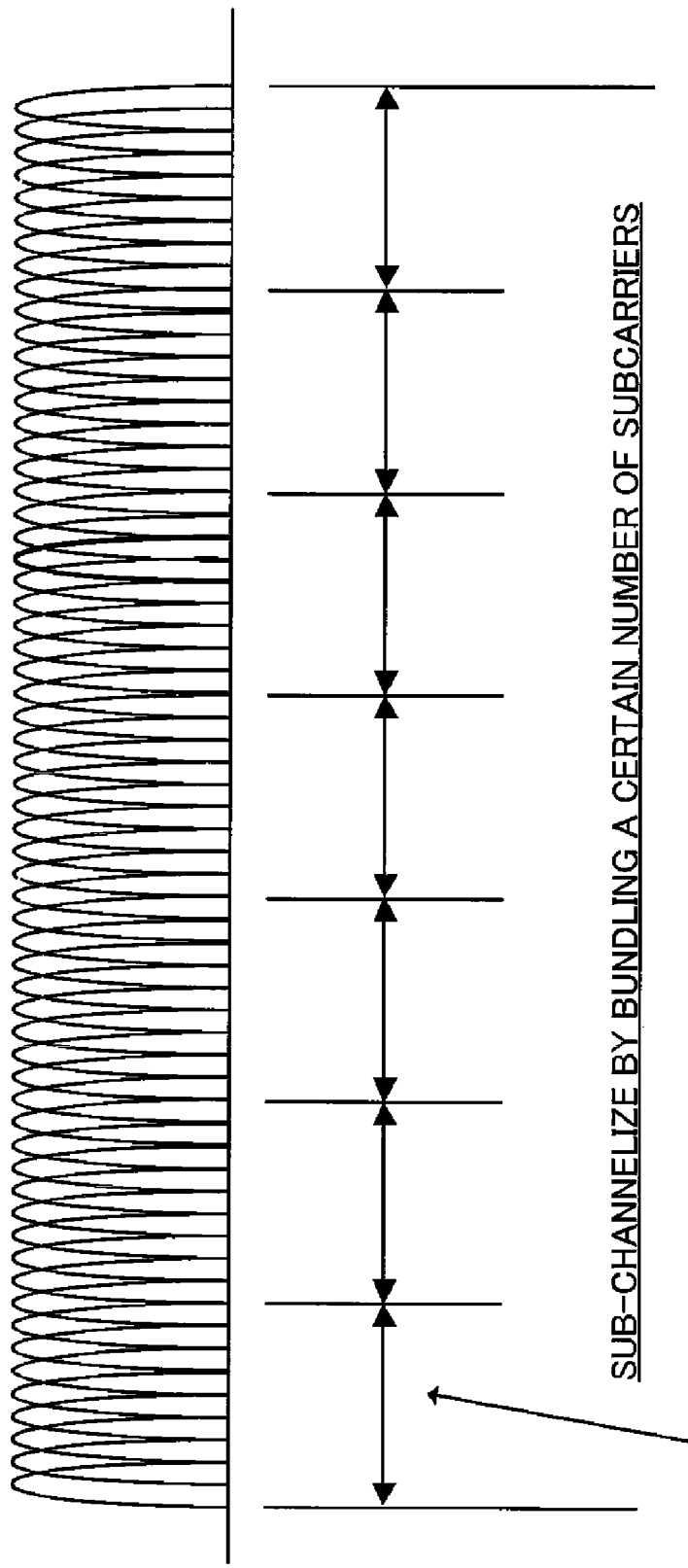
FIG. 14 is a diagram showing sub-channelization in OFDMA.
Figure 15:
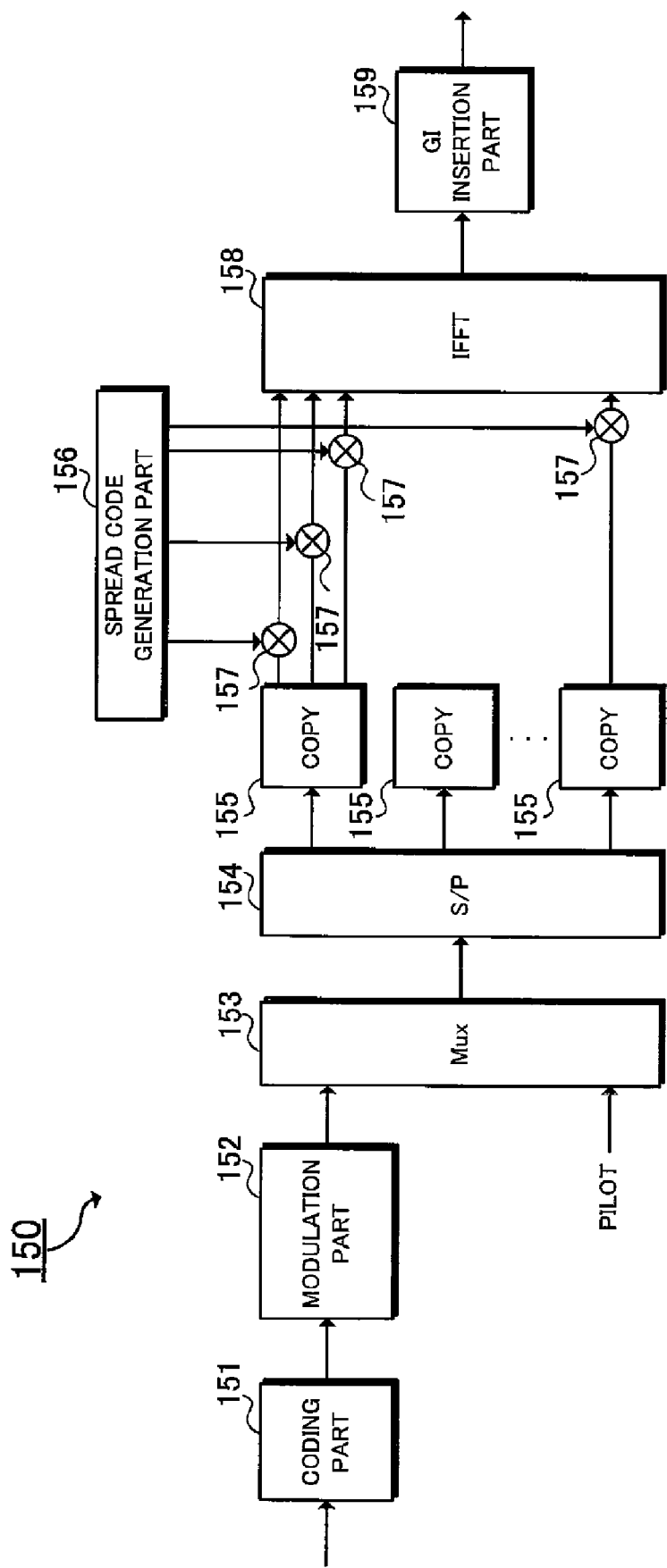
FIG. 15 is a block diagram showing the outline configuration of a transmitter that performs an MC-CDMA communication.
Figure 16:
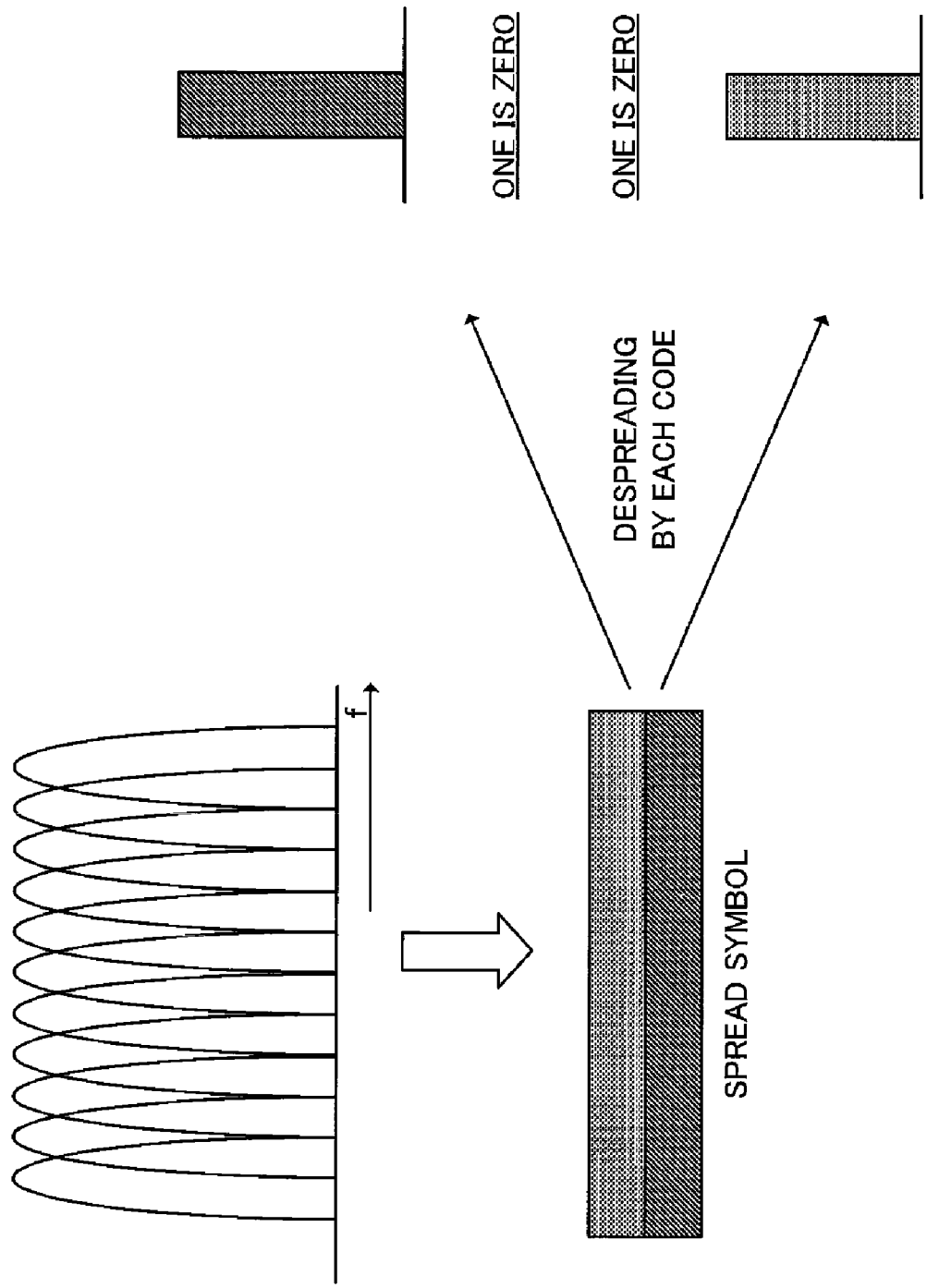
FIG. 16 is a diagram showing a spread symbol and a despread symbol.
Figure 17:
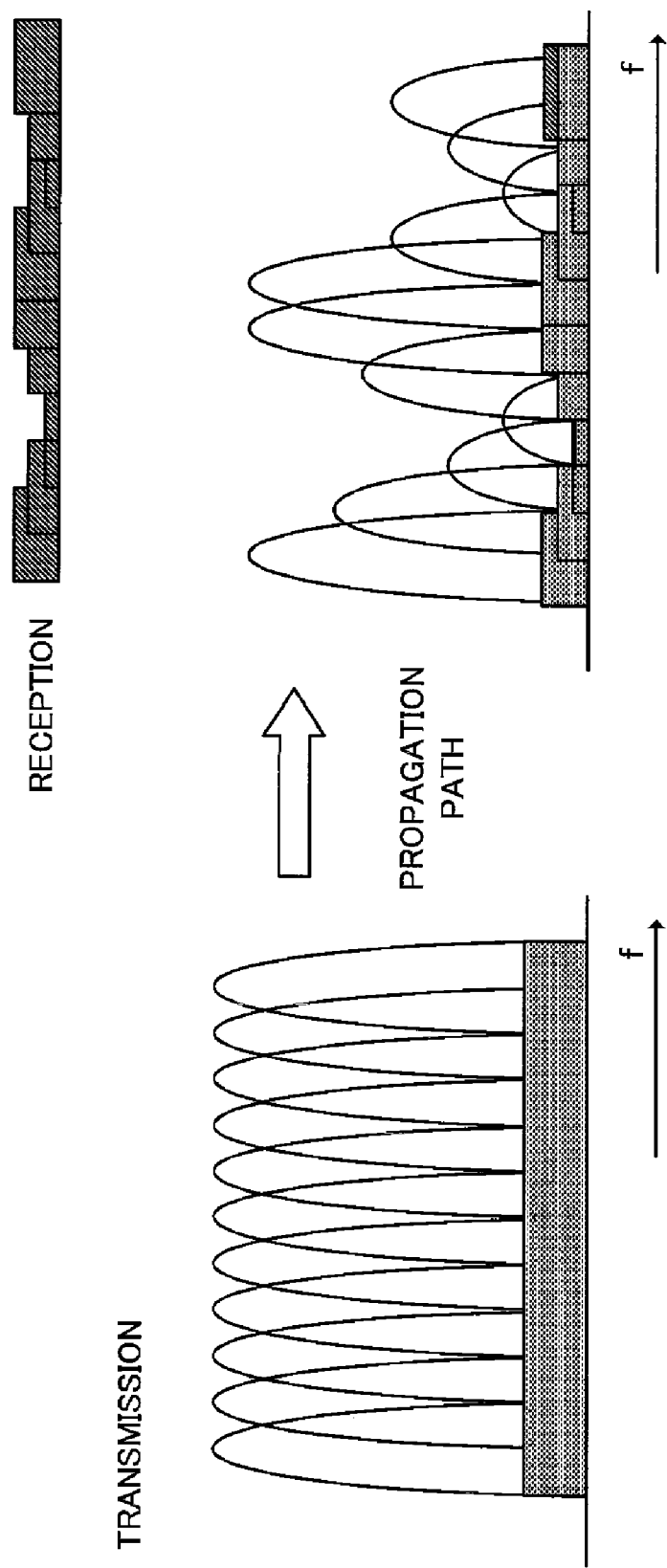
FIG. 17 is a diagram showing how different a received signal to be detected is depending on propagation path conditions.

Incidentally, as shown in FIG. 14, it is also effective to sub-channelize by bundling a certain number of subcarriers in OFDMA. That is, spreading occurs in units of one sub-channel block. Processing can thereby be simplified compared with when spreading occurs in units of subcarrier.

According to each of the above embodiments, as has been described above, it will become possible to suppress interference caused by other multiplexed spread codes.

EXPLANATIONS OF LETTERS OR NUMERALS

1: Transmitter
2: Coding part
3: Subcarrier modulation part
4: Multiplexing part (Mux part)
5: S/P conversion part
6: Copying part
7: Spread code generation part
8: Multiplier
9: Rearrangement control part
10: Transmission signal rearrangement part
11: IFFT part
12: Guard interval insertion part
61: Transmission signal rearrangement part
62: Adaptive modulation control part
63: Coding part
64: Spread code generation part
65: Multiplier
66: Subcarrier modulation part
67: Multiplexing part (Mux part)
68: S/P conversion part
69: IFFT part
70: Guard interval insertion part
100: Transmitter
110: Frequency spreading factor calculation part
130: Transmitter
131: Transmission signal rearrangement part
132: OFDMA control part
133: Coding part
134: Spread code generation part
135: Multiplier
136: Subcarrier modulation part
137: Multiplexing part (Mux part)
138: S/P conversion part
139: IFFT part
140: Guard interval insertion part

The invention claimed is:

1. A wireless communication apparatus performing a wireless communication by allocating a communication slot identified by one or more time channels defined by a fixed time length and one or more frequency channels defined by a fixed frequency band to each terminal device to be controlled; said apparatus comprising:
    a rearrangement control part that allocates subcarriers to each said terminal device; and
    a rearrangement part that distributes spread codes to the subcarriers allocated to each said terminal device,
    wherein said rearrangement control part groups subcarriers in the communication slot that has approximately identical received power according to a spreading factor based on received power information indicating received power of each subcarrier received from a communicating apparatus and allocates grouped subcarriers to each said terminal device.

2. A communication method performing communications by allocating a communication slot identified by one or more time channels defined by a fixed time length and one or more frequency channels defined by a fixed frequency band to each device to be controlled, the communication method comprising the steps of:
    allocating subcarriers to each said device;
    distributing spread codes to the subcarriers allocated to each said device;
    grouping subcarriers in the communication slot that has approximately identical received power according to a spreading factor based on received power information indicating received power of each subcarrier; and
    allocating grouped subcarriers to each said device.

3. A communication apparatus performing communications by allocating a communication slot identified by one or more time channels defined by a fixed time length and one or more frequency channels defined by a fixed frequency band to each device to be controlled; said communication apparatus comprising:
    a rearrangement control section that allocates subcarriers to each said device; and
    a rearrangement section that distributes spread codes to the subcarriers allocated to each said device,
    wherein said rearrangement control section groups subcarriers in the communication slot according to a spreading factor based on received power information indicating received power of each subcarrier received from a communicating apparatus and allocates grouped subcarriers to each said device,
    wherein said rearrangement control section groups the subcarriers into at least a first group of subcarriers and a second group of subcarriers, and wherein the group compares the received power with the highest reference value and groups the subcarriers having received power higher than a first reference value as the first group of subcarriers according to a spreading factor, and wherein the group compares the received power with the second highest reference value and groups the subcarriers having received power higher than a second reference value as the second group of subcarriers according to a spreading factor, and wherein the first reference value is a different value than the second reference value.

4. A communication method performing communications by allocating a communication slot identified by one or more time channels defined by a fixed time length and one or more frequency channels defined by a fixed frequency band to each device to be controlled, the communication method comprising the steps of:

allocating subcarriers to each said device;

distributing spread codes to the subcarriers allocated to each said device;

grouping subcarriers, into at least a first group of subcarriers and a second group of subcarriers, according to a spreading factor based on received power information indicating received power of each subcarrier; and allocating grouped subcarriers to each said device;

wherein the first group of subcarriers consists of subcarriers having received power higher than a first reference value, wherein the second group of subcarriers consists of subcarriers having received power higher than a second reference value, and wherein the first reference value is a different value than the second reference value.

\* \* \* \* \*